(12) United States Patent
Rossetti et al.

(10) Patent No.: US 11,744,405 B2
(45) Date of Patent: Sep. 5, 2023

(54) AUTOMATED STATION COMPRISING A PROCESSING TOOL FOR EDIBLE LIQUIDS AND ASSEMBLING METHOD THEREOF

(71) Applicant: MAKR SHAKR SRL, Turin (IT)

(72) Inventors: Emanuele Rossetti, Turin (IT); Andrea Bulgarelli, Turin (IT)

(73) Assignee: MAKR SHAKR SRL, Turin (IT)

( * ) Notice: Subject to any disclaimer, the term of this patent is extended or adjusted under 35 U.S.C. 154(b) by 0 days.

(21) Appl. No.: 17/919,290

(22) PCT Filed: Apr. 12, 2021

(86) PCT No.: PCT/IB2021/052995
§ 371 (c)(1),
(2) Date: Oct. 17, 2022

(87) PCT Pub. No.: WO2021/209878
PCT Pub. Date: Oct. 21, 2021

(65) Prior Publication Data
US 2023/0143464 A1 May 11, 2023

(30) Foreign Application Priority Data
Apr. 15, 2020 (IT) .......................... 102020000007939

(51) Int. Cl.
*A47J 43/00* (2006.01)
*A47J 43/042* (2006.01)

(52) U.S. Cl.
CPC .................................. *A47J 43/042* (2013.01)

(58) Field of Classification Search
CPC .................................................... A47J 43/042
See application file for complete search history.

(56) References Cited

U.S. PATENT DOCUMENTS

| | | | |
|---|---|---|---|
| 2009/0007802 | A1 | 1/2009 | Taitler |
| 2015/0201808 | A1* | 7/2015 | Katsuki ..................... A23N 1/02 241/199.12 |
| 2016/0016133 | A1* | 1/2016 | Merritt .................. B01F 27/806 366/242 |
| 2018/0199754 | A1 | 7/2018 | Blatt |
| 2019/0387919 | A1 | 12/2019 | Huang et al. |

FOREIGN PATENT DOCUMENTS

| | | |
|---|---|---|
| WO | 2005089572 A1 | 9/2005 |
| WO | 2019109137 A1 | 6/2019 |

* cited by examiner

*Primary Examiner* — Anshu Bhatia
(74) *Attorney, Agent, or Firm* — Bayramoglu Law Offices LLC

(57) ABSTRACT

An automated station is provided with a tool comprising a linear actuator having a power supply inlet adapted to be releasably connected to a feed line; a container for edible liquids; a closure movable by means of the linear actuator between a closed position in which the edible liquid is in the container so that the liquid is shaken by the action of the automated station and an open position in which the edible liquid is poured out of the container in a controlled manner through the action of the automated station; and a lever arm pivoted and connected between the linear actuator and the closure so as to reduce the load applied by the actuator to decrease a first resultant force applied by the closure on a fluid seal in the closed position with respect to a second force applied by the actuator to the pivoted lever arm.

11 Claims, 5 Drawing Sheets

AUTOMATED STATION COMPRISING A PROCESSING TOOL FOR EDIBLE LIQUIDS AND ASSEMBLING METHOD THEREOF

CROSS REFERENCE TO THE RELATED APPLICATIONS

This application is the national phase entry of International Application No. PCT/IB2021/052995, filed on Apr. 12, 2021, which is based upon and claims priority to Italian Patent Application No. 102020000007939, filed on Apr. 15, 2020, the entire contents of which are incorporated herein by reference.

TECHNICAL FIELD

The present invention refers to an automatic robotic arm or other automated station for processing edible fluids, e.g. for the preparation of alcoholic or non-alcoholic drinks in an automated bar, e.g. through a computerized control.

BACKGROUND

It is known to prepare a drink or other edible liquid food using an automatic robotic arm.

The need is also felt to create a preparation tool (or end effector) in order to increase the useful life and decrease the costs of construction and replacement in case of damage, as well as the creation of a tool that guarantees the tightness of liquids during all stages of preparation or at least limit the fall of drops/liquids

SUMMARY

The object of the present invention is to provide a robotic arm or other automated station capable of satisfying at least in part the requirements specified above.

The object of the present invention is achieved by means of an automated station preferably comprising a robotic arm having a tool comprising a releasable mechanical coupling adapted to be carried to a free end portion of the robotic arm; a linear actuator having a power input adapted to be releasably connected with a power line, e.g. pneumatic or hydraulic, preferably carried by the robotic arm; a container for edible liquids; a closure movable via the linear actuator between a closed position where the edible liquid is in the container so that, for example, the liquid is shaken by the action of the robotic arm and an open position where the edible liquid is poured in a controlled way out of the container through the action of the robotic arm; and a lever arm pivoted and connected between the linear actuator and the closure so as to reduce the load applied by the actuator to decrease a first force resulting from closure on a fluid seal in said closed position with respect to a second applied force from the actuator to the lever arm.

The pivoted lever arm is simple to make and maintain and this also leads to a reduction in related costs. Furthermore, the reduction of the force allows the use of actuators available in product catalogs, and therefore relatively inexpensive and widely available on the market.

According to a preferred embodiment, the pivoted lever arm comprises a first end connected to the closure and a second end connected to the linear actuator, thus creating a second class lever, the first end being connected to the closure so that the closure can rotate and/or translate with respect to the first end, i.e. there is at least one degree of freedom, so as to adapt in the closed position to a leading edge of the container.

The closure is not rigidly connected to the first end portion but a relative movement is allowed which can be obtained in various ways e.g. by means of a deformable rubber connecting rod, a rigid connecting rod with at least one braked hinge which maintains the angular position of the closure when only the weight force of the closure is applied to the hinge. When instead, e.g. through contact with the leading edge, a limit load is applied to the closure via the linear actuator, the braked hinge allows the closure to be adapted to the leading edge.

According to a preferred embodiment of the present invention, the linear actuator has a sleeve and a stem movable with respect to the sleeve, the stem being fixed to a support of the container and the sleeve being fixed to said arm.

In this way, the linear actuator is mounted upside down, e.g. with the jacket upwards and the stem downwards when the container is in a substantially vertical position to contain the liquid and the closure is open. This favors the evacuation of any drops of edible liquid by gravity without the latter entering the gap between the stem and the liner. In fact, especially when the container is in a vertical position upwards and the closure is open, the edible liquid has fallen onto the shirt e.g. during the agitation of the container when the closure is closed, it also moves downwards on the stem and does not cross the gap between the stem and the liner. This gap is protected by a seal which is thus safeguarded. Furthermore, the liquid is often sugar-based and the above avoids the contamination of internal components of the jacket and therefore their degradation due to corrosion.

According to a preferred embodiment of the present invention, the closure has a wet surface arranged towards the inside of the container when the closure is closed, in which the wet surface comprises one or more projections.

The projections, depending on the shape, slow down or block drops of liquid moving by gravity when the closure is open. In this way, the drops of liquid that fall by gravity from the closure when the latter is open are reduced and dirty the surfaces arranged under the tool, requiring consequent cleaning operations.

According to a preferred embodiment, the projections and the corresponding grooves have a tangential path with respect to an axis of the closure and are preferably concentric or spiral.

In this way, the drops of liquid are hindered with particular effectiveness in the downward movement by gravity when the closure is open.

According to a preferred embodiment, the container is releasably connected to a frame of the tool defining a fulcrum of the lever arm.

In this way, when a replacement of the container is necessary, for example due to damage after a collision, a new container is easily assembled while the other interfaces of the tool, e.g. the power supply of the linear actuator, the pivoted lever arm etc. remain installed on the end portion of the robotic arm.

According to a preferred embodiment, the container has at least one transparent portion.

In this way, a visual inspection is possible during the preparation of liquid food e.g. while the end portion is moving to shake.

According to a preferred embodiment, the container is made of a material having a first breaking load which is lower than a second breaking load of a frame material.

In this way, in the event of a collision, the container, which has a relatively low replacement and construction cost, is damaged by safeguarding the other, more expensive components of the tool which in the meantime has been stopped by its automatic control system.

According to a preferred embodiment of the present invention the container comprises a bottom with a hole and the releasable connection comprises a screw or other releasable clamping element though the hole, a fluid seal being interposed between the screw and the bottom and compressed at least partially when the screw is tightened to rigidly connect the container to the frame.

Other advantages of the present invention are discussed in the description and cited in the dependent claims.

BRIEF DESCRIPTION OF THE DRAWINGS

The invention is described below on the basis of non-limiting examples illustrated by way of example in the following figures, which refer respectively to.

DETAILED DESCRIPTION OF THE EMBODIMENTS

Figure 1:
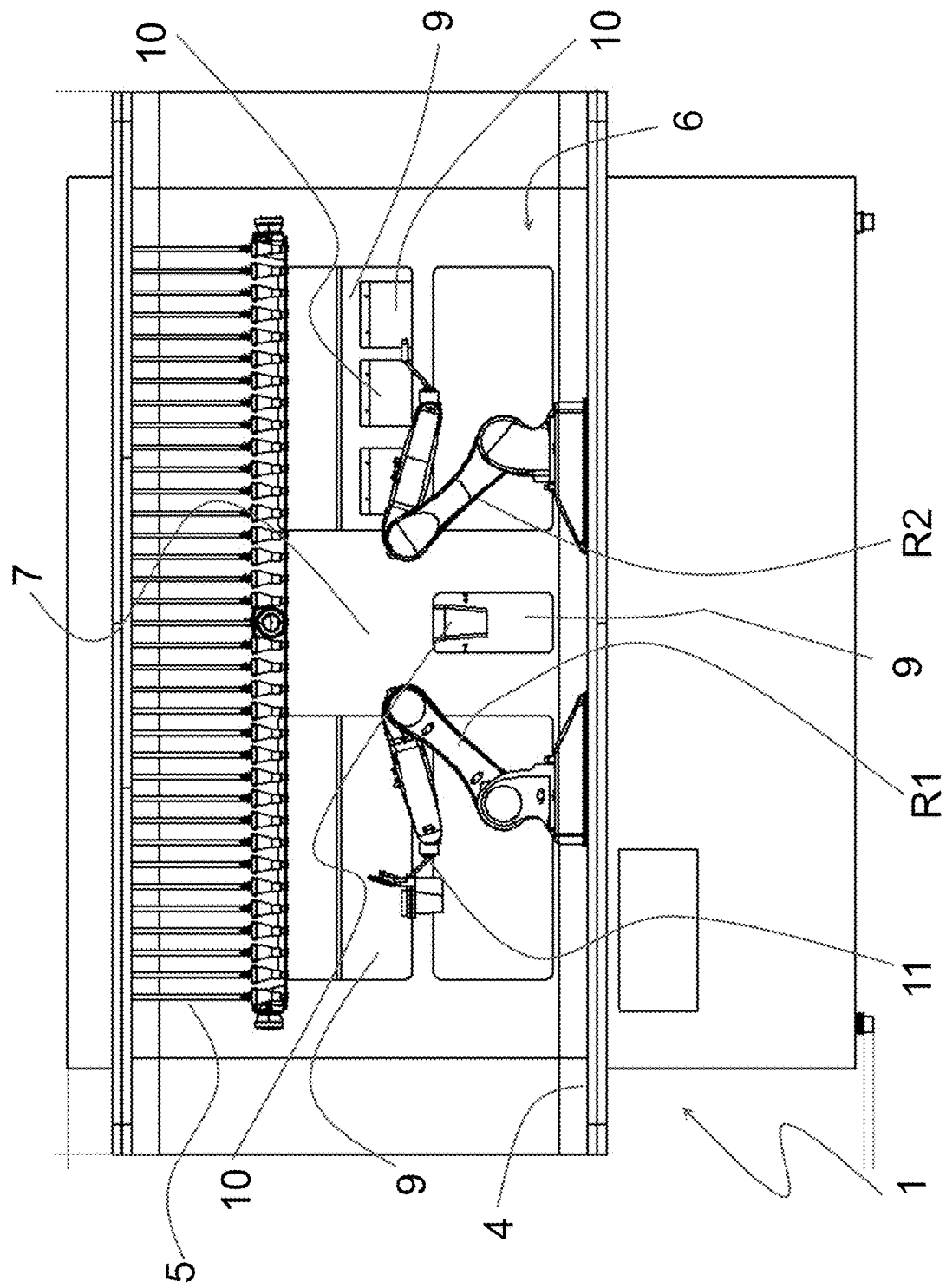
FIG. 1 is a front view of an automatic station for the preparation of drinks comprising a robotic arm according to the present invention.

FIG. 1 indicates by 1, as a whole, a robotic station comprising a first and a second articulated robotic arm R1, R2 resting on a counter 4. A plurality of supports 5 are arranged above the counter 4 to keep the bottles of edible fluids upside down, for example ingredients of beverages or drinks. The robotic arms R1, R2 and the counter 4 are visible from the outside of the robotic station through an opening 6 which, in the embodiment of FIG. 1, is a through window delimited above and below, being the right and left fully open. In this way, the preparation of the food is fully visible to an individual in the vicinity of the robotic station.

On the opposite side of the opening 6 with respect to the robotic arms R1, R2 there is a dividing wall 7 which delimits the counter 4 and defines a plurality of accesses 9 to which one or both arms R1, R2 approach during the execution of the procedure of preparation of a food. Each access 9 corresponds to a respective functional module 10 comprising an electromechanical or pneumatic device for treating or releasing an ingredient of the food. Preferably one or more functional modules 10 also comprise sensors or containers connected together with the electromechanical or pneumatic device to perform a treatment operation of the relevant ingredient. For example, the functional modules include slicers, ice grinders, dispensers, in particular dispensers of fluid but not liquid or granular ingredients. For example, a fluid but not liquid ingredient is a sauce, a pasta, a cream, whipped cream. Furthermore, some functional modules are provided to perform operations on objects, such as for example a cup dispenser or a washing and disinfection module of an end tool 11 carried by at least one of the robotic arms R1, R2. Preferably further functional modules are arranged in the area below the work surface of the counter 4. The partition wall 7 and the counter 4 shield from view and/or protect the functional modules 10 from tampering and/or access by unauthorized personnel.

According to the embodiment of the figure, tool 11 is implemented to seal a container and allow bartending operations such as mixing, stirring or the like.

Figure 2:
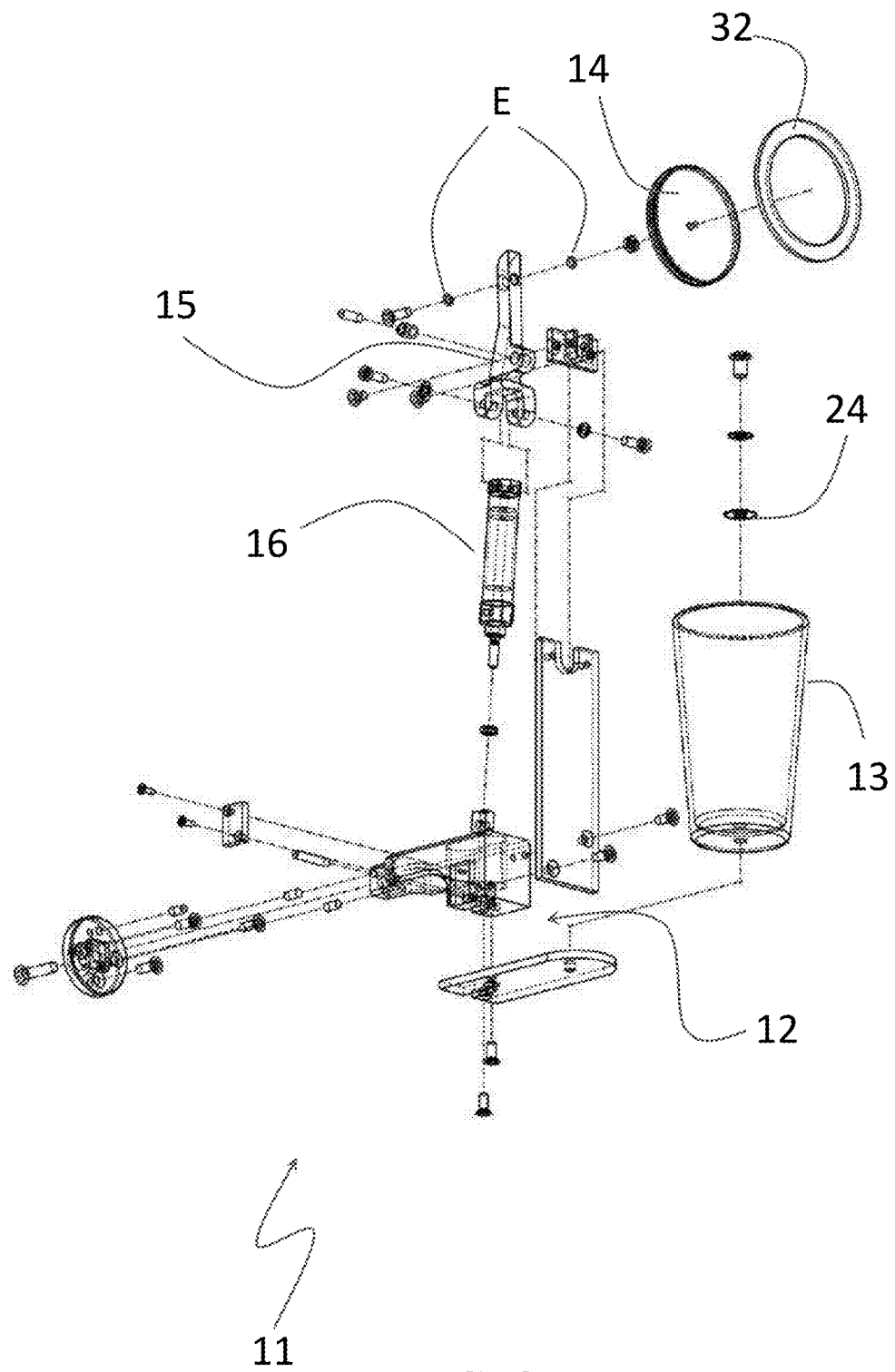
FIG. 2 is an exploded view of a tool carried by an end portion of the robotic arm of FIG. 1.

FIG. 2 illustrates tool 11 in greater detail. Tool 11 comprises a support structure 12 releasably connected to a free end portion of the robotic arm R1, a container 13 for edible liquids e.g. shaped like a cup and carried by the support structure 12, a movable closure 14 to selectively close the container 13, a lever mechanism 15 to move the closure 14 between an open position shown in the FIG. 2 and a closed position in which the liquid is trapped in the container 13 to perform one or more bartending operations. The mechanism is operated by means of a preferably pneumatic linear actuator 16 and functionally connected to a compressed air system of the robotic station.

Figure 3:
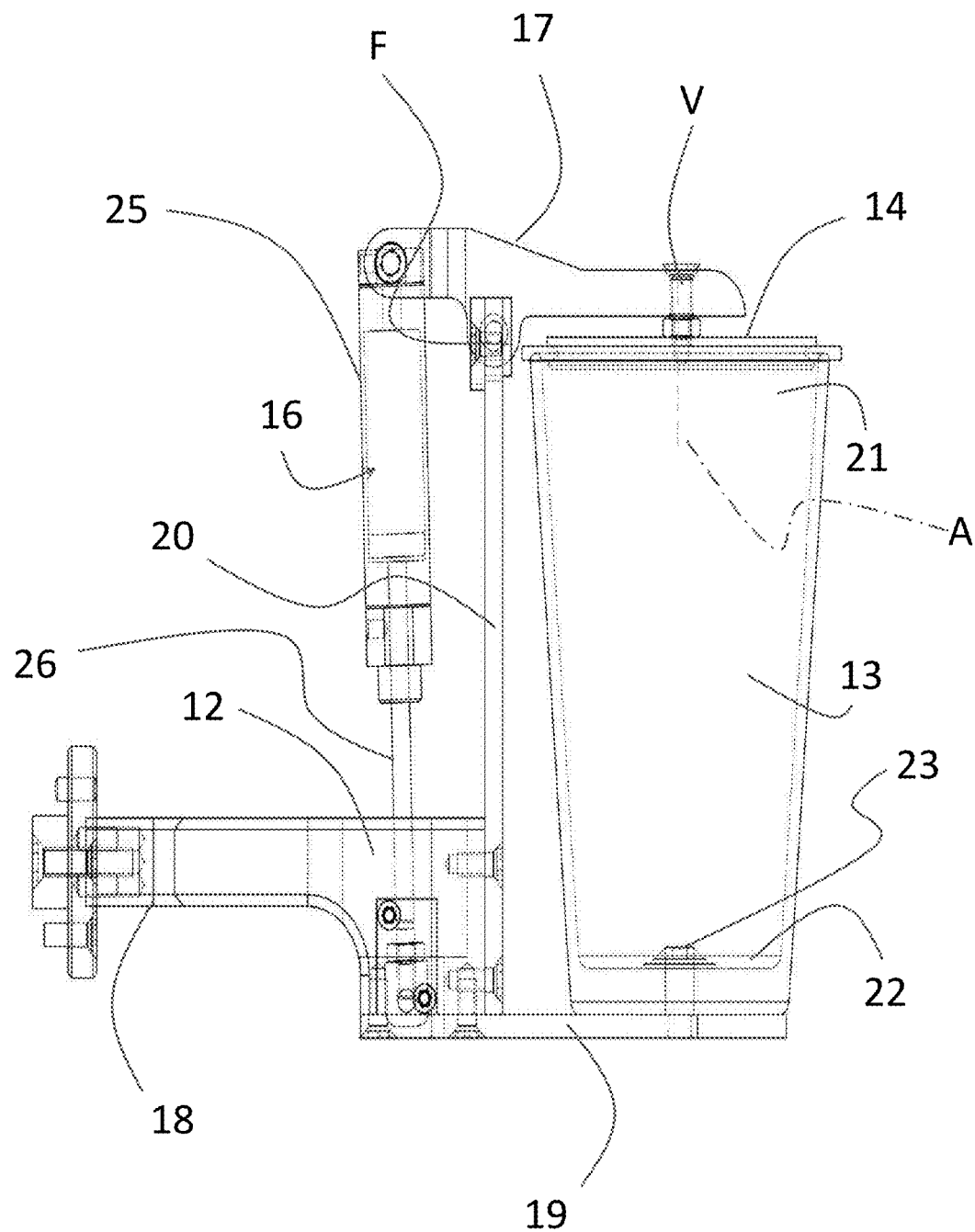
FIG. 3 is a side view of the tool of FIG. 2.
Figure 4:
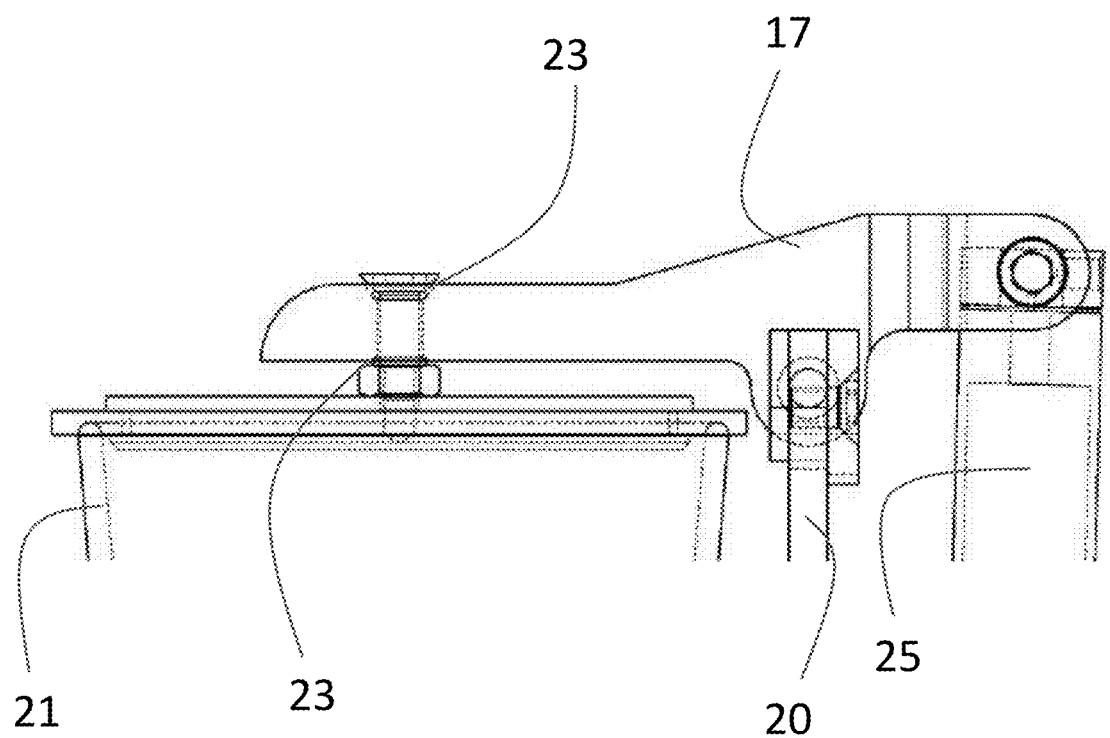
FIG. 4 is an enlarged partial side view of an upper portion of FIG. 2.

Preferably (FIG. 3) mechanism 15 is an unfavorable lever with respect to the linear actuator 16 i.e. the force of the actuator is reduced by the geometry of the lever when applied to the closure 14. In this regard, the lever mechanism 15 comprises an arm 17 pivoted asymmetrically on the support structure 12 so that a first distance between the fulcrum F and a point of application of force of the linear actuator on the arm is less than a second distance between the fulcrum F and a connection point between the closure 14 and the arm 17. Preferably, the support structure 12 has an inverted T shape having an lower left branch 18 configured to connect to the free end portion of the robotic arm R1, a lower right branch 19 carrying the container 13 and an elongated central body 20 which, on the opposite longitudinal part of the branches 18 and 19, defines the fulcrum F of the lever mechanism 15.

From one part of the elongated central body 20, arm 17 carries closure 14 preferably by means of a connection with at least one degree of freedom so that the closure is movable with respect to the arm in order to be able to best adapt to a leading edge 21 of container 13 when the latter is closed. Even more preferably, the degree of freedom is angular about a substantially transverse axis, preferably perpendicular to that of the closure. According to the embodiment of the figures, an elongated connecting element, e.g. a screw V, is coaxial to the axis A of closure 14 and is housed with radial play in arm 17. This play is preferably closed by one or more elastic elements e.g. o-ring E (FIG. 2).

Opposed longitudinally to the edge 21, container 13 comprises a bottom 22 rigidly connected to the lower right branch 19. The connection is releasable and preferably comprises a screw 23 passing through bottom 22 in a hole. In order to avoid liquid leakage through the releasable connection, a fluid seal 24 (FIG. 2) is provided, which is activated when the connection is tightened. In the example shown, the fluidic seal 24 is an o-ring that is compressed by a head of screw 23 when the latter is tightened on lower right branch 19. Similarly, it is possible to adapt a bayonet connection, snap etc. It is also possible that the container has brackets or other projections without any holes and that the container is fixed to branch 19 or to body 20 by means of such brackets e.g. by means of a shape coupling.

According to a preferred embodiment, bottom 22 is perforated when the container 13 is made of glass or other fragile and transparent material so that it is possible to see from the outside at least the level of liquid contained in container 13. More generally, the container is made of a material having a breaking load lower than that of support structure 12 so that, in the event of an accidental impact, container 13 is damaged, even so as to be unusable, before causing further damage to the support structure and/or an actuation unit of the robotic arm R1. By means of the releasable connection, even an irreparably damaged container 13 can be replaced quickly and at low cost.

On the opposite side of container 13 with respect to elongated central body 20, linear actuator 16 is mounted in such a way as to limit or prevent the entry of drops of edible liquid between the moving parts. The actuator includes a jacket 25 and a stem 26 removable from jacket 25. The actuator can be both fluidic and electromechanical, e.g. rotary motor connected to a rack carried by the rod by means of a sprocket. As shown in the figures, jacket 25 is connected to mechanism 15 and stem 26 to the support structure 12. In this way, when tool 11 is in a position such that leading edge 21 is upwards (FIG. 3), a drop of liquid moves by gravity without penetrating the gap between the stem and the jacket.

Figure 5:
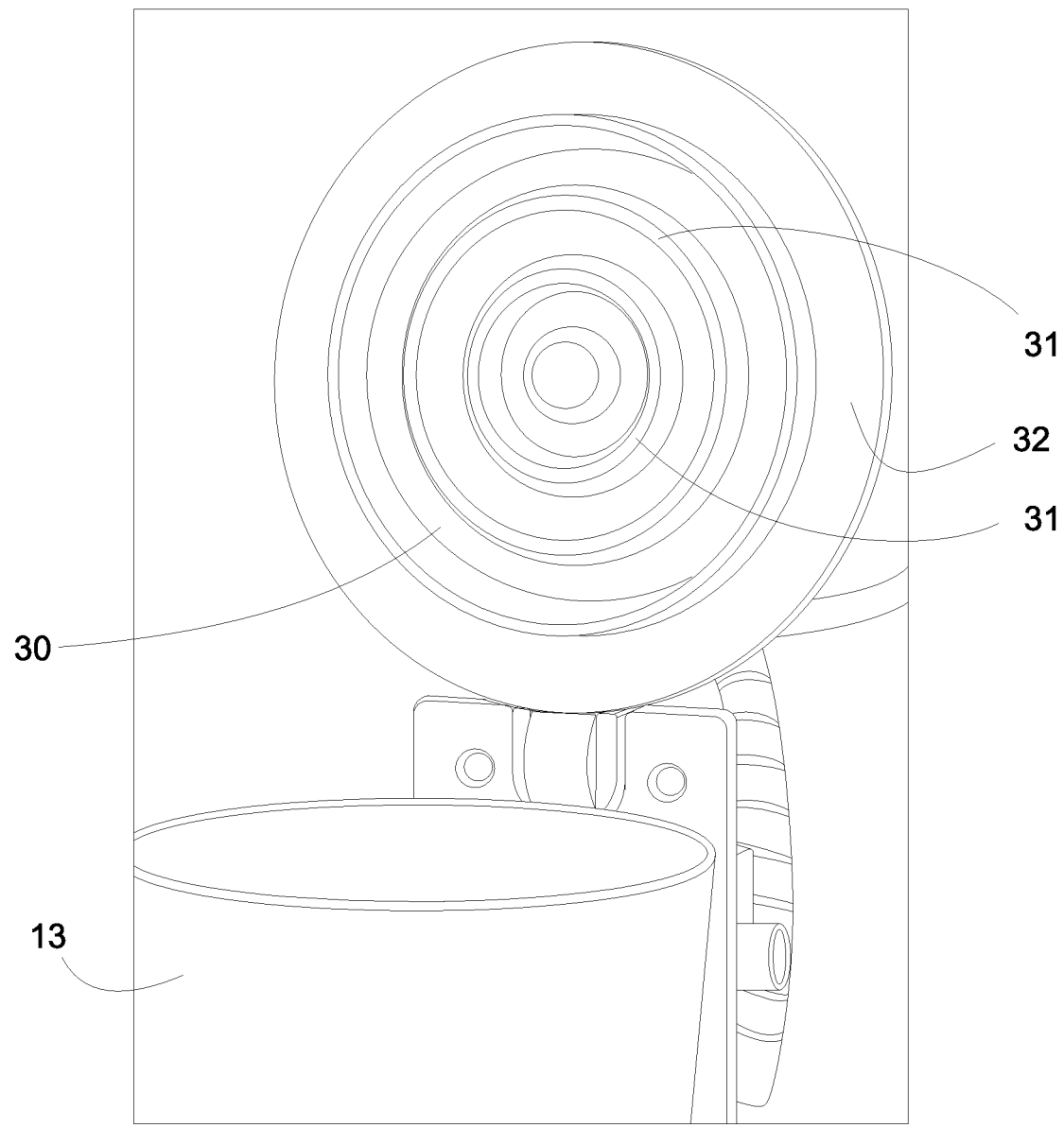
FIG. 5 is a photograph of an enlarged detail of the tool in FIG. 2.

FIG. 5 shows a wet face 30 of the closure 14, i.e. the face facing the liquid in container 13 when the latter is closed and full. In order to avoid the dispersion by gravity of drops of edible liquid when closure 14 is open, wet face 30 defines at least one protuberance 31 arranged in relief in the same direction as an axis of the closure 14. This protuberance hinders the gravity fall of the liquid drops when the closure is open. Furthermore, preferably, protuberance 31 protrudes when the closure is in the open position such that an untrapped drop falls by gravity into container 13 when tool 11 is with an axis of container 13 in the rest position such that a quantity maximum allowable liquid in the container remains inside container 13 even when closure 14 is open. With reference to the figures, an example of this rest position is that in which an axis of container 13 is in a vertical position, i.e. that of FIG. 5. In FIG. 5, a preferred embodiment is illustrated in which a plurality of protuberances 31 is provided, each of which has a crest that follows a tangential path, in particular circular and concentric, with respect to an axis of cover 13.

FIG. 5 further shows a fluidic seal 32, e.g. a ring preferably of a material based on silicone or other elastomer for food, which is pressed on the leading edge 21 by linear actuator 16 when container 13 is closed.

Finally, it is clear that it is possible to make changes or variants to the automatic robotic arm R1 described and illustrated here without departing from the scope of protection as defined by the attached claims.

For example, container 13 can be completely transparent or only partially.

Furthermore, tool 11 can be releasably connected to a non-anthropomorphic robotic arm, such as the one illustrated in FIG. 1, but moved with at least one degree of freedom e.g. by translation along three orthogonal Cartesian axes. In general, tool 11 can be mounted on board an automatic station which includes a mechanism implemented to collect ingredients and perform one or more bartending operations.

What is claimed is:

1. An automated station having a tool comprising:
   a releasable mechanical coupling for connecting to a mobile portion of the automated station;
   a linear actuator having a power supply input adapted to be releasably connected to a power supply line;
   a container for edible liquids;
   a closure movable via the linear actuator between a closed position in which the edible liquid is in the container so that the liquid is shaken by an action of the mobile portion and an open position in which the edible liquid is poured in a controlled manner out of the container via the action of the mobile portion; and
   a lever arm pivoted and connected between the linear actuator and the closure so as to reduce a load applied by the actuator to decrease a first resultant force applied by the closure on a fluid seal in the closed position with respect to a second force applied by the actuator to the lever arm.

2. The automated station according to claim 1, wherein the lever arm comprises a first end connected to the closure and a second end connected to the linear actuator, wherein the first end is connected to the closure so that the closure has at least a degree of freedom with respect to the first end to adapt in the closed position to a top edge of the container.

3. The automated station according to claim 1, wherein the linear actuator has a jacket and a stem movable with respect to the jacket, wherein the stem is fixed to a support of the container and the jacket is fixed to the lever arm.

4. The automated station according to claim 1, wherein the closure has a wet surface arranged towards an inside of the container when the closure is in the closed position, wherein the wet surface comprises one or more projections.

5. The automated station according to claim 4, wherein at least one of the projections protrudes so that a drop falls by gravity from the projection into the container when the closure is in the open position and the container is full in a resting position.

6. The automated station according to claim 4, wherein at least one of the projections have respective edges each of which with a tangential pattern with respect to an axis (A) of the closure.

7. The automated station according to claim 1, wherein the container is releasably connected to be replaced independently of the linear actuator and the lever arm.

8. The automated station according to claim 1, the container has at least a transparent portion for seeing when the container is closed on an edible liquid level.

9. The automated station according to claim 1, wherein the container is made of a material having a first breaking load lower than a second breaking load of a material of a support of the tool, wherein the container, the linear actuator and the pivoted arm are carried by the support.

10. The automated station according to claim 1, wherein the container comprises a bottom with a hole and the releasable connection comprises a clamping element within the hole, wherein a fluid seal is interposed between the clamping element and the bottom and compressed at least partially when the clamping element is tightened.

11. An assembly method comprising steps of providing an automated station having a mobile portion and releasably mounting a tool on the mobile portion comprising a linear actuator having a power inlet adapted to be releasably connected to a power line; a container for edible liquids; a closure movable via the linear actuator between a closed position in which the edible liquid is in the container so that the liquid is shaken by an action of the mobile portion and an open position in which the edible liquid is poured in a controlled manner out of the container via the action of the mobile portion; and a lever arm pivoted and connected between the linear actuator and the closure so as to reduce a load applied by the actuator to decrease a first resultant force applied by the closure on a fluid seal in the closed position with respect to a second force applied by the actuator to the lever arm.

* * * * *